Sept. 5, 1939.   T. A. LARRY ET AL   2,171,939
APPARATUS FOR FLUID CONTROL
Original Filed Sept. 14, 1936   2 Sheets-Sheet 1
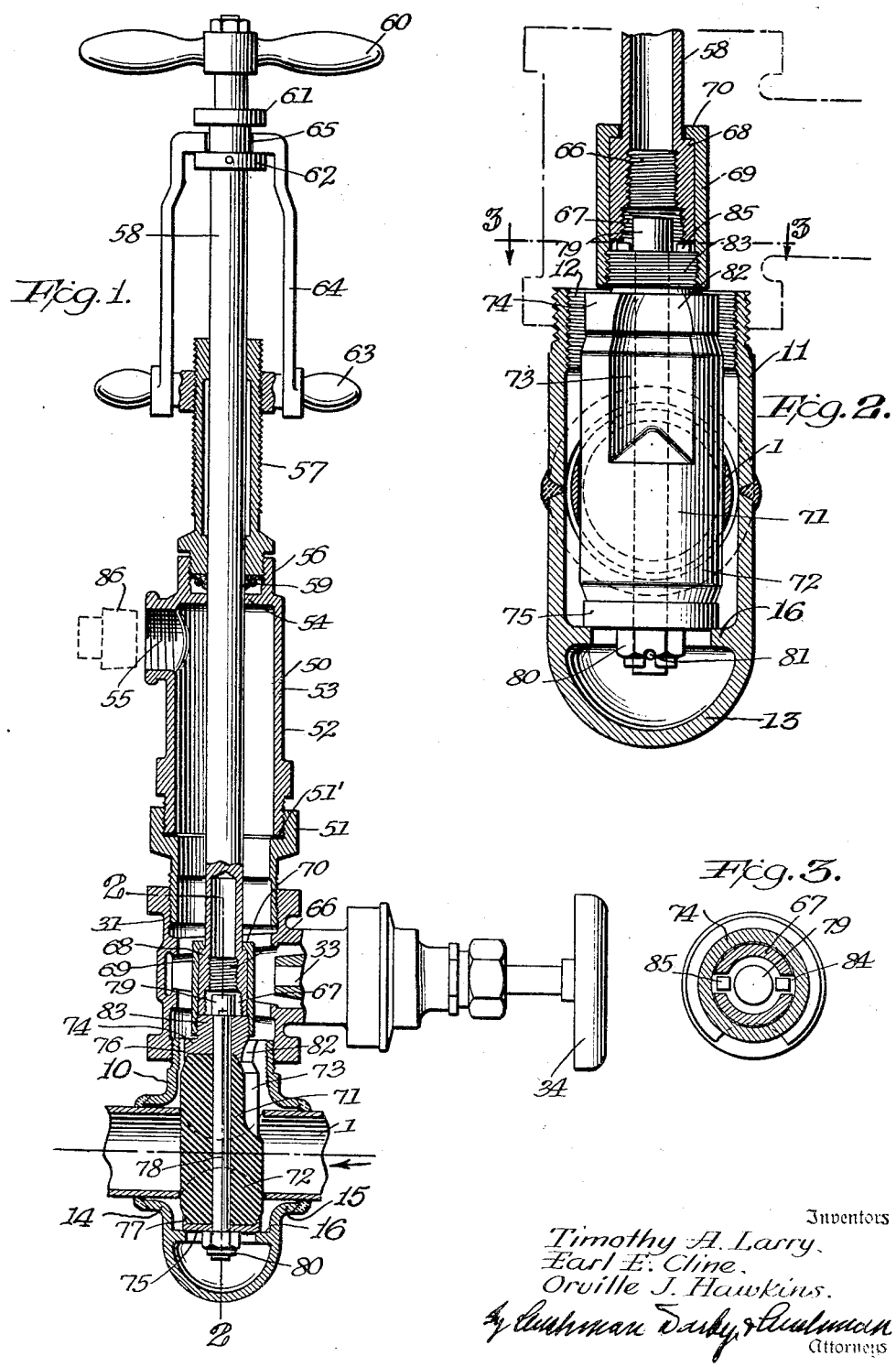
Inventors
Timothy A. Larry.
Earl E. Cline.
Orville J. Hawkins.
by Cushman Darby & Cushman
Attorneys

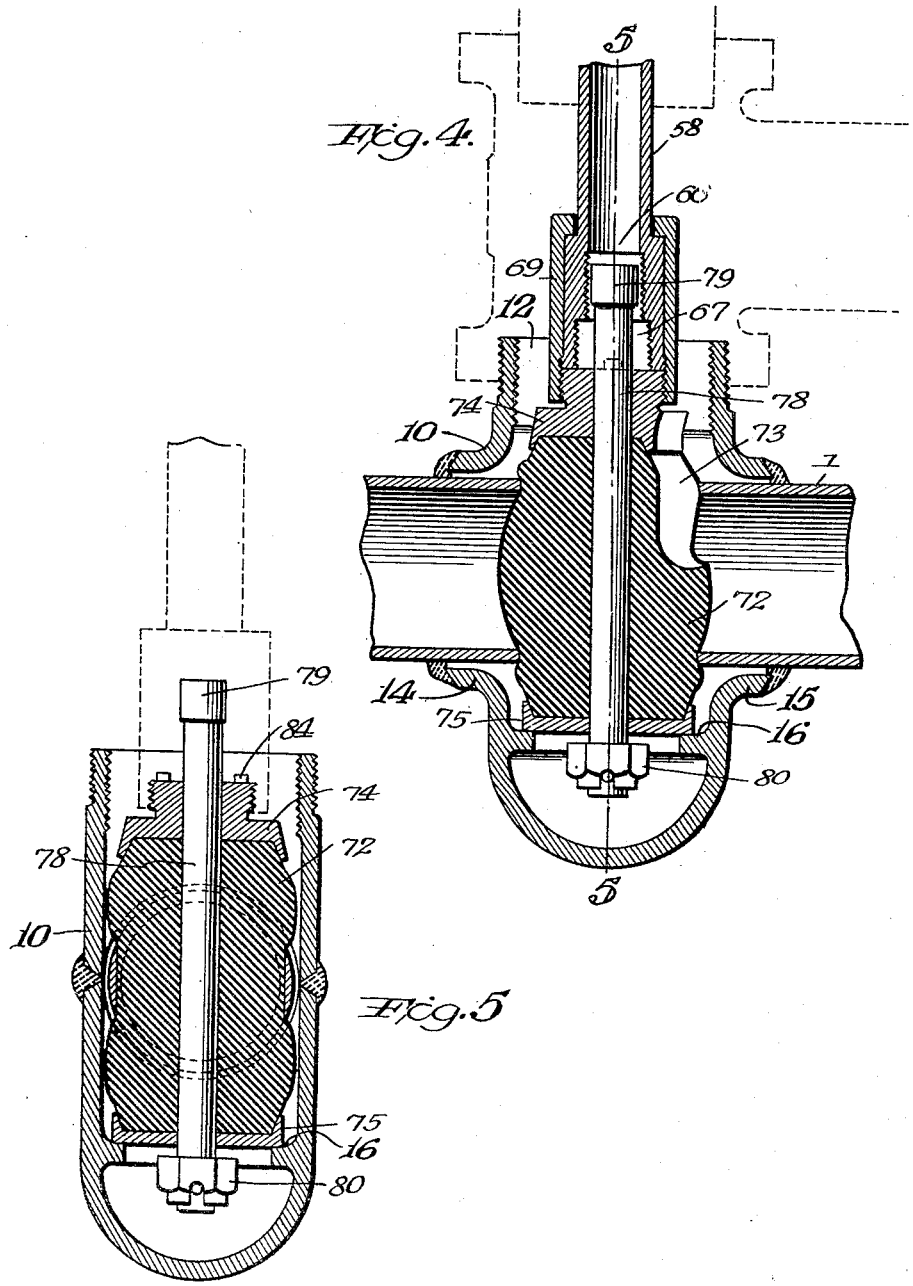

Patented Sept. 5, 1939

2,171,939

UNITED STATES PATENT OFFICE

2,171,939

APPARATUS FOR FLUID CONTROL

Timothy Allan Larry, Earl E. Cline, and Orville J. Hawkins, Decatur, Ill.; said Cline and said Hawkins assignors to Mueller Co., Decatur, Ill., a corporation of Illinois Original application September 14, 1936, Serial No. 100,780. Divided and this application February 27, 1937, Serial No. 128,284

1 Claim. (Cl. 251—59)

This invention relates to apparatus whereby fluid, under pressure, may be temporarily by-passed or diverted around a section of a fluid conduit, which is to be repaired, replaced, or otherwise operated upon, without substantial loss of fluid or fluid pressure and without interrupting the flow of fluid in the remainder of the conduit.

In the maintenance or extension of public service mains and branch or service pipes, such as are used to conduct gas, oil, water or other fluids, it is frequently necessary to repair, replace, or perform other operations on a section of the conduit, without interrupting service to consumers whose service pipes communicate with the conduit at points above and below the section. This necessitates the provision of a by-pass line connected to the conduit at points on either side of the section to be operated on, whereby the fluid may flow around the section, and the insertion of valve members for shutting off the flow of fluid into the section. The circuit through the by-pass line must be completed before, or simultaneously with, the shutting off of said section in order that there will be no interruption in the flow of fluid. Furthermore, the by-pass line must be connected to the conduit, the valve members inserted in the conduit and other operations performed, without permitting any appreciable escape of fluid or fluid pressure.

An object of the present invention is to provide apparatus for connecting a by-pass line and shutting off a section of a conduit, as described in our copending application Serial No. 100,780, filed September 14, 1936, of which this application is a division with a minimum of labor and expense.

A further object of the invention is to provide apparatus whereby the flow of fluid may be diverted from a pipe line at any desired point and, of course, this apparatus may or may not be used with other apparatus for reintroducing the fluid into the pipe line at another point.

Other objects of the invention will be apparent from the accompanying description and drawings.

Referring to the drawings:

Figure 1 is a view, partly in section, of the apparatus applied to a pipe line.

Figure 2 is a transverse view, partly in section, taken on the line 2—2 of Figure 1.

Figure 3 is a horizontal section taken on the line 3—3 of Figure 2.

Figure 4 is a detail sectional view of part of the apparatus shown in Figure 1, illustrating the relative positions generally assumed by the parts when the valve member is longitudinally compressed and distorted.

Figure 5 is a transverse sectional view taken on the line 5—5 of Figure 4.

Referring more particularly to the drawings, Figure 1 shows the flow-diverting apparatus of this invention applied to a pipe line, designated by the numeral 1, it being assumed that the pipe line is intended to convey fluid in the direction shown by the arrow.

The apparatus includes a fitting 10 which is preferably constructed and secured to the pipe line in the manner described in the copending application Serial No. 100,780 referred to above.

The fitting consists of a substantially cylindrical portion 11 having an opening 12 at its upper end and closed at its lower end 13. The upper end is preferably threaded exteriorly and interiorly for the attachment of other apparatus. The fitting is provided with aligned lateral openings, which are bounded by the laterally extending hubs 14 and 15 and which are adapted to receive the pipe 1. The lower cylindrical portion of the fitting is provided interiorly with a circumferential projection or abutment 16 which is adapted to limit the inward or downward movement of the valve member which, as will be described, is inserted through the open end of the fitting.

After the fittings have been welded to the pipe at the point from which it is desired to divert the flow of the fluid, a valve body 31 having a tapered valve seat 32 and provided with a valve, preferably a gate valve 33, operable by handle 34, is threaded on the upper end of the fitting.

An enclosed drilling apparatus is then secured to the upper end of the valve body and, after the gate valve 33 has been withdrawn, the portion of the top and bottom wall of the pipe which is within the fitting 10 may be cut away without loss of fluid or fluid pressure. This drilling operation is more fully described in the copending application Serial No. 100,780 referred to above.

When the drilling is completed, the gate valve 33 is closed and the drilling apparatus removed after which the flow-diverting apparatus may be secured to the upper end of the valve body 31. This apparatus includes an adapter 51, externally screw threaded at its lower end for attachment to the upper end of the valve body 31 and it is preferably provided at its upper end with internal screw threads for the attachment of the flow-diverting chamber 52.

The flow-diverting chamber 52 is preferably substantially cylindrical and its lower end, which is open, is externally screw threaded for engagement with the internal screw threads at the upper end of the adapter 51. An annular gasket 51' is inserted between the by-passing chamber and the adapter to provide a fluid tight joint. The chamber 52 comprises the substantially cylindrical side wall 53 and a centrally apertured top wall 54. The side wall 53 is provided with an internally threaded opening 55 to which a pipe may be connected if it is desired to continue the conduit formed by the valve body 31, adapter 51 and chamber 52, leading from the upper end of the fitting. The side wall of the chamber 52 extends above the top wall 54 and the extension 56 is provided with internal threads for the attachment of a feed sleeve 57.

A bar 58 is slidably and rotatably mounted within the feed sleeve 57 and within the centrally apertured top wall 54 of the flow-diverting chamber, a tight joint being maintained around the lower end of the feed sleeve, by means of a conventional packing 59 located between the feed sleeve 57 and the upper wall 54 of the chamber 52.

The bar 58 is provided at its upper end with an operating handle 60. Spaced collars 61 and 62 are fixed on the upper portion of the bar 58 and in order that the bar 58 may be forced upwardly or downwardly, a feed screw 63 is threaded on the feed sleeve 57 and may be connected with the bar 58 by means of a yoke 64 pivoted upon the feed screw 63 and having its head portion slotted as at 65 so that it may be swung into engagement with the bar 58 between the collars 61 and 62, as shown in Figure 1.

The lower end of the bar 58 is provided with a socket 66 provided with left-handed internal threads, and a lower counter-bored socket 67 internally threaded with right-handed threads. The lower end of the bar 58 is slightly enlarged to provide a shoulder 68 for the retention of a sleeve 69, the upper end of which is internally flanged at 70. The sleeve 69, which is adapted to be slipped on over the top of the bar 58, during the assembly thereof and before the handle 60 and collars 61 and 62 are attached, extends below the lower extremity of the bar 58 and is provided at its lower end with internal screw threads for the attachment of the flow-diverting valve 71.

Referring to Figures 1 and 2, the flow-diverting valve generally designated at 71, includes a substantially cylindrical member 72, made of some resilient material such as rubber. The member 72 is partially cut away at one side as is shown at 73 and the cut-away portion preferably extends from a point approximately half way down its side upwardly and inwardly to the top of the member. Disk-like caps 74 and 75, which are preferably inwardly flanged as shown at 76 and 77, are positioned above and below the member 72. The caps 74 and 75 and the member 72 are centrally apertured for the reception of a rod 78 on which they are slidably mounted. The rod 78 is provided at its upper end with a slightly enlarged head 79 and its lower end is threaded for the reception of a nut 80 whereby the member 72 may be clamped between the upper and lower caps 74 and 75 when the nut 80 is tightened. The nut 80 is preferably provided with slots on its under surface and the rod 78 is apertured at its lower end for the reception of the usual locking pin 81.

The upper cap 74 is cut away at one side as at 82 to conform with the cut-away portion 73 of the member 72, and the flange 76 follows the contour of the cut-away portion, in order to prevent rotation of the member 72 with respect to the cap 74 after the parts are assembled. The cap 74 is provided with a central and upwardly extending cylindrical portion 83 which is externally threaded for attachment to the internally threaded sleeve 69.

When the cylindrical portion 83 of the cap 74 is threaded into the sleeve 69 it will abut the lower end of the bar 58 and it will therefore be apparent that downward pressure on the bar 58 will be directly transmitted to the cap 74. It will also be apparent that upward movement of the bar 58 will raise the cap 74 by reason of the fact that the internally flanged sleeve 69 engages the lower enlarged end of the bar 58 and also engages the upwardly extending central portion 83 of the cap 74.

The lower extremity of the bar 58, which forms the socket 68, is provided with slots 84, 84, adapted to receive lugs 85, 85, positioned on the upper surface of the cylindrical portion 83, as shown in Figure 3, whereby relative rotation of the cap 74, and consequently the member 72, with respect to the bar 58, will be prevented.

The object of the procedure now to be described is to prevent the flow of fluid into the section of the pipe 1 shown on the left hand side of the flow-diverting member 71 (Figure 1) while causing the fluid to flow out of the pipe 1 through the open end of the fitting and through the conduit formed by the valve body 31, the adapter 51, the chamber 52 and its outlet 55.

By turning the handle 60, the member 72 is rotated until its cut away portion 73 is aligned with the axis of the pipe 1 and faces upstream. The bar 58 is then moved downwardly, by pushing down on the handle 60, until the member 72 is in the position shown in Figure 1, the downward movement being arrested when the lower cap 75 of the member 72 contacts the inwardly projecting abutment 16 of the fitting 10.

It will be understood that suitable symbols may be placed on the handle 60 to indicate the direction in which the cut away portion faces.

The yoke 64 is now swung to upright position engaging the bar 58 between the collars 61 and 62, as shown in Figure 1, and the feed screw 63 is turned to the right to apply downward pressure, through the collar 62 and bars 58, to the cap 74.

The cap 75 at the lower end of the member 72 is held against downward movement by the abutment 16 of the fitting 10, and since the member 72 is made of resilient material, the downward pressure on the cap 74 will cause the member 72 to expand laterally as shown in Figures 4 and 5.

The caps 74 and 75 and the member 72 are slidable on the rod 78 and therefore the position which the rod will assume, after compression of the member 72, will not always be the same as it will depend, to some extent, upon the frictional quality of the resilient material of which the member 72 is made. Figures 4 and 5 illustrate one position which the rod 78 may assume and it will be noted that the cap 74 has moved downwardly a considerable distance from the head 79 of the rod 78, with the result that the head 79 is positioned within the socket 66. In view of this possible range of movement, the apparatus is preferably so designed that the diameter of the head 79 will be smaller than the internal diameter of the socket 66. It will also be noted that the fitting 10 should be of sufficient depth to allow for a considerable downward movement of the rod 78.

Upon expansion of the member 72, it will be forced into contact with the adjacent walls of the pipe 1, as shown in Figures 4 and 5, and act as a valve to close off, at its upper end, the section of the pipe which is below or downstream with respect to the member 72. Fluid may continue to flow from the portion of the pipe 1 above the fitting, by reason of the provision of the cut away portion 73 in the member 72 which permits flow of fluid from the pipe 1 upwardly through the opening 12.

When it is desired to restore flow through the section and to remove the flow-diverting apparatus, this may be accomplished expeditiously and without loss of fluid pressure by the use of the apparatus and method to be hereinafter described.

The first step in the method of removing the flow-diverting apparatus consists in turning the feed screw 63 to the left to relieve the downward pressure on the flow-diverting member 72. This will result in a lateral contraction of the flow-diverting member, owing to the resiliency of the material of which it is made, and, the fluid will flow through the spaces thus created between the flow-diverting member and the adjacent walls of the pipe, and into the section of the pipe 1 which is downstream from the apparatus.

The yoke 64 may then be disengaged from the bar 58, and the member 72 is drawn up into the chamber 52 by pulling up on the handle 60. Although this procedure may be carried out without difficulty in most instances, because of the tendency of the member 72 to assume its normal cylindrical shape and thus equalize the pressure in the portions of the pipe on either side of the member, it has been found that, in some cases, where the pressure is exceedingly high, the member 72 may be forced into such tight engagement with a portion of the pipe that the resiliency of the flow-diverting member will not be sufficient to bring about the above mentioned contraction. In such cases, equalization of pressure is preferably effected by rotating the handle 60 of the bar 58 through an angle of approximately 45°, with the result that the cut away portion 73 of the member 72 will face in a direction at right angles to the axis of the pipe 1. A passageway for the fluid will thus be created between the sections of the pipe on either side of the member 72, through the cut away portion 73, and pressure having thus been equalized, the member 72 may be removed without difficulty by disengaging the yoke 64 and pulling up on the handle 60.

After the member 72 has been withdrawn into the chamber 52, the gate valve 33 may be operated to closed position and the flow-diverting apparatus removed without substantial loss of fluid.

If the valve body 31 is to be removed, a closure plug may be threaded into the upper end of the fitting 10 in the manner described in the copending application Serial No. 100,780 referred to above, and the flow-diverting apparatus including the valve body 31 may thus be removed without substantial loss of fluid.

It will be apparent that the above described apparatus and procedure may be modified without departing from the scope of the invention and it is intended that all matter contained in the above description or shown in the accompanying drawings be regarded as merely illustrative.

The fitting which is shown herein and the method of attaching the same to a pipe, form the subject matter of copending applications of Timothy Allan Larry and Earl E. Cline, Serial No. 100,782, filed September 14, 1936, Serial No. 122,248, filed January 25, 1937, and Serial No. 122,249, filed January 25, 1937.

We claim:

In an apparatus adapted to be attached to a pipe for temporarily diverting the flow of fluid therefrom, a fitting having a substantially cylindrical portion open at its upper end and closed at its lower end, the cylindrical portion having aligned lateral openings therein, through which the pipe extends, a resilient and substantially cylindrical valve member adapted to be inserted within the fitting, a portion of at least the top and bottom wall of the pipe within the cylindrical member being cut away so that the valve member may be inserted within the pipe, an abutment in the fitting adapted to limit the downward movement of the valve member, said valve member being cut away at one side, the cut away portion extending from a point on its side, between its ends, upwardly and inwardly to the upper end so as to provide a passageway for fluid, a conduit secured to the upper end of said fitting adapted to conduct fluid therefrom, and means secured to the upper end of said valve member, said means being rotatable so that the valve member may be turned to a position in which its cut away portion faces upstream, said means also being movable axially so that said valve member may be axially compressed and laterally expanded into sealing engagement with the walls of the pipe, when urged against said abutment, to prevent flow of fluid from the upstream side of the fitting to that portion of the pipe which is connected to the other side of the fitting and to permit flow of fluid through the cut away portion of the valve member into the conduit secured to the upper end of the fitting, when the valve member is positioned with its cut away portion facing upstream.

TIMOTHY ALLAN LARRY.
EARL E. CLINE.
ORVILLE J. HAWKINS.